US009865850B2

(12) United States Patent
Pflueger et al.

(10) Patent No.: US 9,865,850 B2
(45) Date of Patent: Jan. 9, 2018

(54) SUPPORTING ELEMENT FOR A HOUSING OF A VEHICLE TRACTION BATTERY

(71) Applicant: Bayerische Motoren Werke Aktiengesellschaft, Munich (DE)

(72) Inventors: Eberhard Pflueger, Muensingen (DE); Andreas Fent, Straubing (DE); Semi Ben Salah, Finsing (DE); Dominic Mueller, Freising (DE)

(73) Assignee: Bayerische Motoren Werke Aktiegesellschaft, Munich (DE)

( * ) Notice: Subject to any disclaimer, the term of this patent is extended or adjusted under 35 U.S.C. 154(b) by 113 days.

(21) Appl. No.: 14/659,149

(22) Filed: Mar. 16, 2015

(65) Prior Publication Data

US 2015/0255765 A1    Sep. 10, 2015

Related U.S. Application Data

(63) Continuation of application No. PCT/EP2013/066863, filed on Aug. 13, 2013.

(30) Foreign Application Priority Data

Sep. 18, 2012  (DE) .................. 10 2012 216 649

(51) Int. Cl.
*H01M 2/10* (2006.01)

(52) U.S. Cl.
CPC ....... *H01M 2/1083* (2013.01); *H01M 2/1077* (2013.01); *H01M 2220/20* (2013.01); *Y10T 29/4911* (2015.01)

(58) Field of Classification Search
CPC combination set(s) only.
See application file for complete search history.

(56) References Cited

U.S. PATENT DOCUMENTS 5,221,219 A  * 6/1993 Thomson .............. H01R 11/281
                                                    29/857
5,418,082 A  * 5/1995 Taki ..................... H01M 2/1241
                                                    429/53
(Continued)

FOREIGN PATENT DOCUMENTS

CN    101606251 A    12/2009
CN    102257652 A    11/2011
(Continued)

OTHER PUBLICATIONS

The decision to grant Patent to Application No. 201380046718.8 issued by SIPO dated Jun. 2, 2017.*

(Continued)

*Primary Examiner* — Alex Usyatinsky
(74) *Attorney, Agent, or Firm* — Crowell & Moring LLP

(57) ABSTRACT

The present invention relates to a supporting element for a housing for a vehicle traction battery, the vehicle traction battery being constructed of a number of power storage modules. The supporting element is constructed of a module supporting element and at least one closing element, which has a plate-shaped design, the module supporting element having a number of module fastening elements, to which the number of power storage modules are fastened. Furthermore, the module supporting element has at least one recess which is closed by the plate-shaped closing element. The present invention further relates to a process of producing a corresponding support element for a housing for a vehicle traction battery.

14 Claims, 6 Drawing Sheets

(56) References Cited

U.S. PATENT DOCUMENTS

| | | | |
|---|---|---|---|
| 6,152,776 A * | 11/2000 | Ikeda | H01M 2/1077 |
| | | | 429/121 |
| 6,227,322 B1 | 5/2001 | Nishikawa | |
| 7,128,999 B1 | 10/2006 | Martin et al. | |
| 2011/0269008 A1 * | 11/2011 | Houchin-Miller | B60L 11/1874 |
| | | | 429/120 |
| 2012/0208057 A1 * | 8/2012 | Bender | H01M 2/1083 |
| | | | 429/99 |

FOREIGN PATENT DOCUMENTS

| | | |
|---|---|---|
| CN | 102637837 A | 8/2012 |
| DE | 10 2010 011 890 A1 | 9/2011 |
| DE | 10 2011 000 696 A1 | 8/2012 |
| WO | WO 2010/056750 A2 | 5/2010 |
| WO | WO 2012/028929 A1 | 3/2012 |

OTHER PUBLICATIONS

Chinese Office Action issued in Chinese counterpart application No. 201380046718.8 dated Jul. 4, 2016, with partial English translation (Twenty (20) pages).

International Search Report dated Dec. 16, 2013 (Two (2) pages).

German Search Report dated Jun. 14, 2013 with Statement of Relevancy (Six (6) page).

Chinese Office Action issued in Chinese counterpart application No. 201380046718.8 dated Apr. 6, 2017, with partial English translation (Thirteen (13) pages).

\* cited by examiner

SUPPORTING ELEMENT FOR A HOUSING OF A VEHICLE TRACTION BATTERY

CROSS REFERENCE TO RELATED APPLICATIONS

This application is a continuation of PCT International Application No. PCT/EP2013/066863, filed Aug. 13, 2013, which claims priority under 35 U.S.C. §119 from German Patent Application No. 10 2012 216 649.1, filed Sep. 18, 2012, the entire disclosures of which are herein expressly incorporated by reference.

BACKGROUND AND SUMMARY OF THE INVENTION

The present invention relates to a supporting element for a housing for a vehicle traction battery as well as to a housing having such a supporting element. The invention further relates to a process of producing a supporting element for a housing of a vehicle traction battery, as well as to a process of producing a vehicle traction battery.

Vehicle traction batteries are used, for example, for the drive of hybrid vehicles or electric vehicles. So that the electric machine installed in such vehicles for the drive can be supplied with the necessary electric power, vehicle traction batteries are designed such that they have a high electric output voltage and, in addition, can provide high electric currents. This is achieved in that a large number of storage cells are mutually connected in a parallel and serial manner.

The vehicle traction battery is usually constructed of a number of power storage modules, each of the power storage modules having a number of storage cells which, as a rule are arranged in a stack, which is braced by way of end plates and tension elements. The storage cells contain electrochemical cells by means of which electric power can be stored.

The required large number of storage cells or power storage modules has the result that vehicle traction batteries usually have a large volume. Because of the limited installation possibilities, a vehicle traction battery is often installed in the area of the underbody of a vehicle, which is why the vehicle traction battery has a low height and therefore a large base (definitely up to 150 cm×100 cm). In order to, on the one hand, protect the vehicle traction battery from external effects and, on the other hand, have a retaining possibility in the event that a malfunctioning occurs during the operation of the vehicle traction battery and, for example, electrolyte and/or gas is released in the process, the vehicle traction battery is built into a housing.

A housing for a vehicle traction battery has a supporting element and a covering element, the power storage module being fastened to the supporting element. So that the housing can carry out the desired protecting function, it has to have specific characteristics or meet specific demands. In particular, the supporting element should have a sufficiently high stiffness and, in addition, be able to easily absorb or distribute affecting forces. This results in demands on the material of which the supporting element is made and on the manufacturing process to be used respectively.

It was found that the die casting process is particularly suitable for the manufacturing of housings for vehicle traction batteries, because this process is generally suitable for mass production and, in addition, housings, particularly supporting elements, manufactured in this manner meet the above-mentioned stiffness requirements and force absorption or force conduction demands. Such housings are preferably constructed as aluminum die castings.

However, it is not unproblematic for large-surface components to be manufactured by means of die casting methods, particularly if large-surface housing supporting elements are to be manufactured as aluminum die castings: In principle, explosive forces occur during a casting operation which act upon the two mold halves and force the latter apart. In this case, the explosive forces depend on the surface of the component to be cast and will rise as the component surface increases. When a component to be manufactured reaches a specified surface and the explosive forces therefore reach a specified value, it will no longer be possible to produce a large-surface component in one piece, i.e. in a single casting operation, by means of a conventional die casting machine. As a result, it would only be possible to produce a large-surface component by using a conventional die casting machine if it were constructively divided in two component halves and these two halves were produced separately. In this case, the separation can take place in the longitudinal or transverse direction. This partitioning reduces the individual surfaces and thereby the explosive forces occurring during the casting operation. The two halves produced in two separate casting operations are mutually connected, for example, by being welded or screwed together.

Even if the explosive forces are reduced and can thereby be controlled by the partition of the large-surface component to be manufactured, the division of the component to be manufactured would have the following considerable disadvantages:

The partition into individual parts interrupts the casting geometry of the large-surface component composed of the individual parts, which has a disadvantageous effect on the stability of the component.

If the large-surface component is a supporting element for a housing for a vehicle traction battery, which, for forming the entire housing, is connected with a covering element, the sealing surface between the supporting element and the covering element would be interrupted and therefore have to be finished at high expenditures, because of the fact that the supporting element is composed of individual parts.

The individual parts are to be mutually connected for forming the large-surface component. Because of the resulting connection points or the connection components used for this purpose, the weight of the overall manufactured large-surface component would increase.

Because all individual parts of which the large-surface component is composed, are constructed as die cast parts, the component as a whole has a uniform high minimum wall thickness, resulting in a high weight of the component.

A separate die casting mold is required for each individual part, which significantly raises the costs for the molds in comparison to a production for which the use of a single die casting mold is sufficient.

As a result of the finishing work, which, on the one hand, is required in connection with the sealing surface and, on the other hand, for connecting the individual parts, the production process is more complex and the manufacturing costs are therefore higher.

As a result of the fact that the finished large-surface component is composed of a plurality of individual parts, it has connection points and separating points respectively, limiting the use of the installation space available inside the housing.

It is therefore an object of the present invention to create a supporting element for a housing for a vehicle traction battery, which can be produced in a simple manner and therefore at lower manufacturing expenditures. It is a further object to create a supporting element which, in addition, has a low weight. It is a further object of the present invention to create a process by which a corresponding supporting element can be produced.

These objects are achieved by a supporting element for a housing for a vehicle traction battery, which is constructed of a module supporting element and at least one closing element which has a plate-shaped design, the module supporting element having a number of module fastening elements, to which a number of power storage modules are fastened, of which the vehicle traction battery is constructed, the module supporting element further having at least one recess which is closed by the plate-shaped closing element.

These objects are further achieved by a process for producing a supporting element for a housing for a vehicle fraction battery, by which the following steps are carried out:

Providing a module supporting element which has a number of module fastening elements and at least one recess, Providing at least one closing element of a plate-shaped design, Closing the recess by means of the plate-shaped closing element.

Although the following statements relate to the die casting process or to a supporting element produced by a die casting process, this should not have any fundamental limiting effect. The approach according to the invention can also be used in other production processes; particularly those in which the manufacturing of large-surface components, particularly the production of supporting elements, may present problems. Correspondingly, this also applies to the material of which the supporting element is made. However, the approach according to the invention was worked out on the basis of the above-described explosive—force-related problem existing in the die casting process, therefore resulting, according to current knowledge, in the greatest advantages in the case of this production process.

As a result of the fact that the supporting element has at least one recess, which, in particular, is further developed having a large area, the surface of the supporting element to be produced, more precisely, the area of the module supporting element, is reduced to such an extent that the explosive forces occurring in a casting operation are reduced to such an extent that the supporting element can be produced in one piece, i.e. in a single casting operation; i.e. the module supporting element can be manufactured by using a single mold consisting of two mold halves. Advantageously, the supporting element is constructively divided and designed such that the module supporting element essentially takes over the supporting or bearing function; i.e. the power storage elements are fastened to the module supporting element. The module supporting element therefore represents a bearing structure, whereas the plate-shaped closing element only carries out a closing and thereby enveloping function. In the case of the supporting element according to the invention, the recess is arranged such that, in the unclosed condition, it represents an opening of the vehicle traction battery with respect to the environment. The closing element may be constructed such that the power storage modules are slightly supported on the latter; for example, in that the power storage module is braced by means of a cooling body arranged between the closing element and the power storage module.

The partitioning of the supporting element into a module supporting element, which has a supporting or bearing function, and into a plate-shaped closing element, which essentially has an only enveloping or closing function creates the greatest possible design freedom. This permits the design of a module supporting element whose casting geometry is not interrupted, so that the stability of module supporting element as well as of the supporting element will not be limited. It is thereby also ensured that the supporting element permits a continuous distribution of power, which results in an optimal voltage distribution without any voltage jumps. Furthermore, as a result of a correspondingly suitable definition of the location of the recess, care can be taken that the sealing surface between the supporting element and the covering element will not be interrupted, whereby costly finishing work can be eliminated and the production process will be cost-effective, which will result in lower manufacturing costs. Particularly the sealing geometry will be simplified and thereby more advantageously presentable. Furthermore, the suitable defining of the location of the recess can achieve the following: On the one hand, the expenditures for the refinishing for connecting the individual parts— in this case, for connecting the module supporting element and the plate-shaped closing element—will be lower, which also leads to a reduction of the complexity of the manufacturing process and thus of the manufacturing costs. On the other hand, the connection points between the module supporting element and the closing element can be constructed more cost-effectively or simpler connection components can be used, which both results in a reduction of the weight and of the manufacturing costs of the supporting element. In addition, because of the advantageous selection of the location of the recess, the location of the connection points or separating points can be placed so advantageously that the utilization of the installation space available in the housing will only be insignificantly limited. The available installation space therefore does not have to be used for a connection flange of the two component halves created by longitudinal or transverse division but can be used for the design stiffness of the supporting element. When the module supporting element as well as the plate-shaped closing element are produced by the die casting process, although two mold sets are also necessary, specifically one for the module supporting element and one for the closing element, because the mold set for the closing element is significantly less complex because of the simple geometry of the closing element, the mold-related costs are reduced in comparison to the division of the supporting element in the longitudinal or transverse direction practiced up to now.

A supporting element is thereby created which, while taking into account the mechanical demands, is, on the one hand, optimized with respect to costs and, on the other hand, with respect weight. The optimization with respect to weight will even exist when the module supporting element as well as the closing element are produced of the same material and according to the same manufacturing process respectively.

It should be mentioned at this point that the recess is a large-area recess, which is clearly larger than a recess as provided for the accommodation of a screw, by means of which a power storage module or another component is fastened to the supporting element. The fraction of the recess with respect to the surface of the supporting element, in which the recess is situated, may definitely be in the order of 10 to 20%.

The above-mentioned object is therefore fully achieved.

With respect to the weight reduction, the supporting element can be further optimized, specifically in that the module supporting element and the closing element differ at least with respect to one component parameter. Such a parameter is to characterize the material used for the manufacturing of the respective element or the respectively used manufacturing or production process. In a particularly preferred further development, the module supporting element is a die-cast part, particularly a die-cast aluminum part, and the plate-shaped closing element is a metal plate. The metal plate may consist of aluminum or steel and may be produced, for example, by a stamping or laser-cutting operation. As a result of the fact that the recesses are closed by a metal plate or a sheet-metal plate, the supporting element will no longer have a continuously uniformly high minimum wall thickness, which results in a clear weight reduction. A weight-optimized supporting element can thereby be produced without any loss of stability or stiffness. Since the production of metal sheets is much easier than that of a die-cast part, a supporting element constructed in this fashion also has very low manufacturing costs. As a result of this hybrid construction method, the advantages offered, on the one hand, by the die casting and, on the other hand, by the use of plate-shaped sheet metal elements are mutually linked. As an alternative, instead of the metal sheet, a closing element can be used that is made of a plastic material.

As mentioned above, a housing for a vehicle traction battery has a supporting element and a covering element, in which case there are several implementation options. The covering element may therefore be a separate component, so that after the connection of the supporting element with the covering element, the housing will be separate with respect to the vehicle body. As an alternative, the covering element may be a component of the vehicle body, such as a metal plate arranged in the area of the vehicle underbody or of the vehicle trunk. After the connecting of the supporting element and the covering element, the housing is fixedly connected with the vehicle body and is therefore not separate with respect to the vehicle body. Furthermore, in the case of the housing installed in the vehicle, in a first further development, the covering element may be the top part of the housing and the supporting element may be the bottom part of the housing, while, in a second further development, the covering element may be the bottom part of the housing and the supporting element may be the top part of the housing. The above-described alternatives may be combined with one another, so that a total of four variants of further developments are obtained. The following implementations are based on the variant of a further development in which the covering element is constructed as a separate component, and the supporting element represents the housing bottom part and the covering element represents the housing top part, in which case, the above should not have a limiting effect.

In a further development of the invention, the recess is essentially arranged below at least one fastened power storage module. As a result of this measure, a considerable freedom of design is obtained for the arranging of the recess, because a large area is available below the fastened power storage module within which a large-area recess can be placed without thereby impairing the supporting function of the supporting element. For the supporting element, a clear explosive force reduction can thereby be obtained, on the one hand, with respect to the die-casting process and, on the other hand, a clear weight reduction can be achieved.

Corresponding to a further development of the invention, the number of module fastening elements can consequentially be arranged such that the fastened power storage modules are arranged in a number of rows of power storage modules, the recess and the plate-shaped closing element being in each case designed such that, with respect to their dimensions, they essentially correspond to a surface that is covered by one row of power storage modules. This clearly achieves a reduction of explosive force and weight.

In a particularly preferred further development of the invention, the number of module fastening elements is arranged such that the fastened power storage modules are arranged in a plurality of rows of power storage modules, a recess being arranged below each row of power storage modules. The explosive forces and the weight of the supporting element can be reduced most effectively by this measure.

In a further development of the invention, the module supporting element further has a receiving element encompassing the recess, the receiving element having a bearing area and a the receiving area offset with respect to the bearing area, the closing element being glued to the module supporting element by way of an adhesive arranged in the receiving area. The gluing-together is an inexpensive and cost-effective connecting method for mutually connecting the module supporting element and the closing element. In addition, if preferably an adhesive with a sealing characteristic is used, a gas-tight closure of the housing can be achieved.

For securing the connection of the module supporting element and the closing element, in a further advantageous development of the invention, the bearing area has a number of element fastening holes by way of which the closing element is screwed to the module supporting element. On the whole, the module supporting element and the closing element are mutually connected by being glued and screwed together; i.e. a connecting technique is used that is easy to carry out, whereby the manufacturing costs for the supporting element can be kept low. In addition, the connection elements do not have excessive weight, whereby the weight of the supporting element can be kept low. The supporting element can therefore be produced by simple working steps, specifically, applying the adhesive, placing the closing element in the recess of the module supporting element and screwing-together the closing element and the module supporting element.

As an alternative, the supporting element and the closing element can also be mutually connected by riveting or welding.

While using a supporting element as described above, a vehicle traction element can be produced corresponding to the following process steps:

Providing a supporting element, which is constructed of a module supporting element and at least one plate-shaped closing element, the module supporting element having a number of module fastening elements and at least one recess, which is closed by means of the plate-shaped closing element, Providing a number of power storage modules, Fastening the power storage modules to the module fastening elements, and Connecting the supporting element with a covering element.

Embodiments of the invention are illustrated in the drawing and will be explained in detail in the following description:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
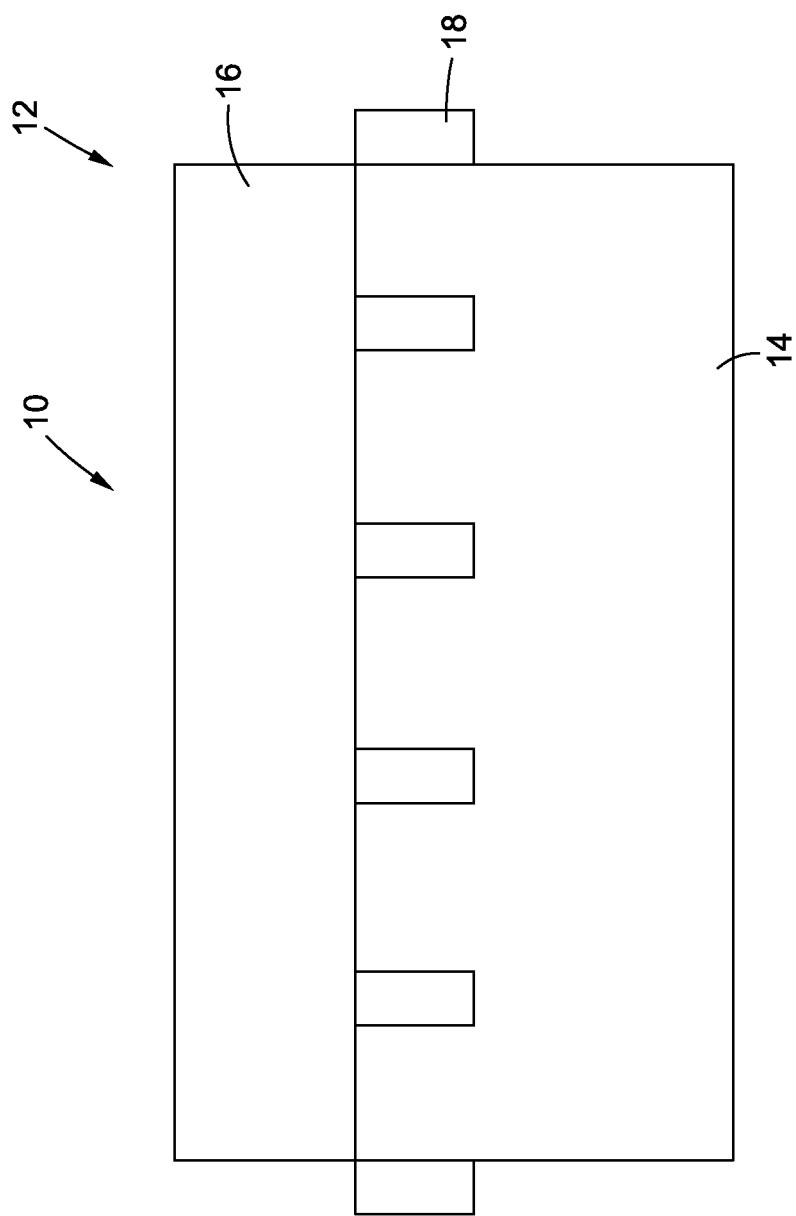
FIG. 1 is a lateral view of a housing for a vehicle traction battery.

FIG. 1 is a lateral view of a housing 10 for a vehicle traction battery 12, which has a supporting element 14 and a covering element 16. The supporting element 14 has a supporting design, i.e. it has a supporting function, power storage modules contained in the vehicle traction battery being fastened to the supporting element. In contrast, the covering element 16 has no supporting function. For reasons of clarity, a sealing element normally inserted between the supporting element 14 and the covering element 16 for sealing the housing interior off with respect to the environment, is not shown in FIG. 1. Housing fastening elements are mounted on the supporting element 14, by way of which the supporting element 14 and thereby the housing 10 can be fastened to a vehicle component, which is not shown, as an example, one of these housing fastening elements being marked with the reference number 18.

The illustration selected in FIG. 1, according to which the supporting element 14 is the housing bottom part and the covering element is the housing top part, should have no limiting effect. Naturally, the supporting element 14 according to the invention can also be used for the construction of a vehicle traction battery housing, where the covering element is formed by a component of the vehicle body. Furthermore, in the installed condition, the housing 10 can also be arranged in the vehicle such that the supporting element 14 is the housing top part and the covering element 16 is the housing bottom part.

Figure 2:
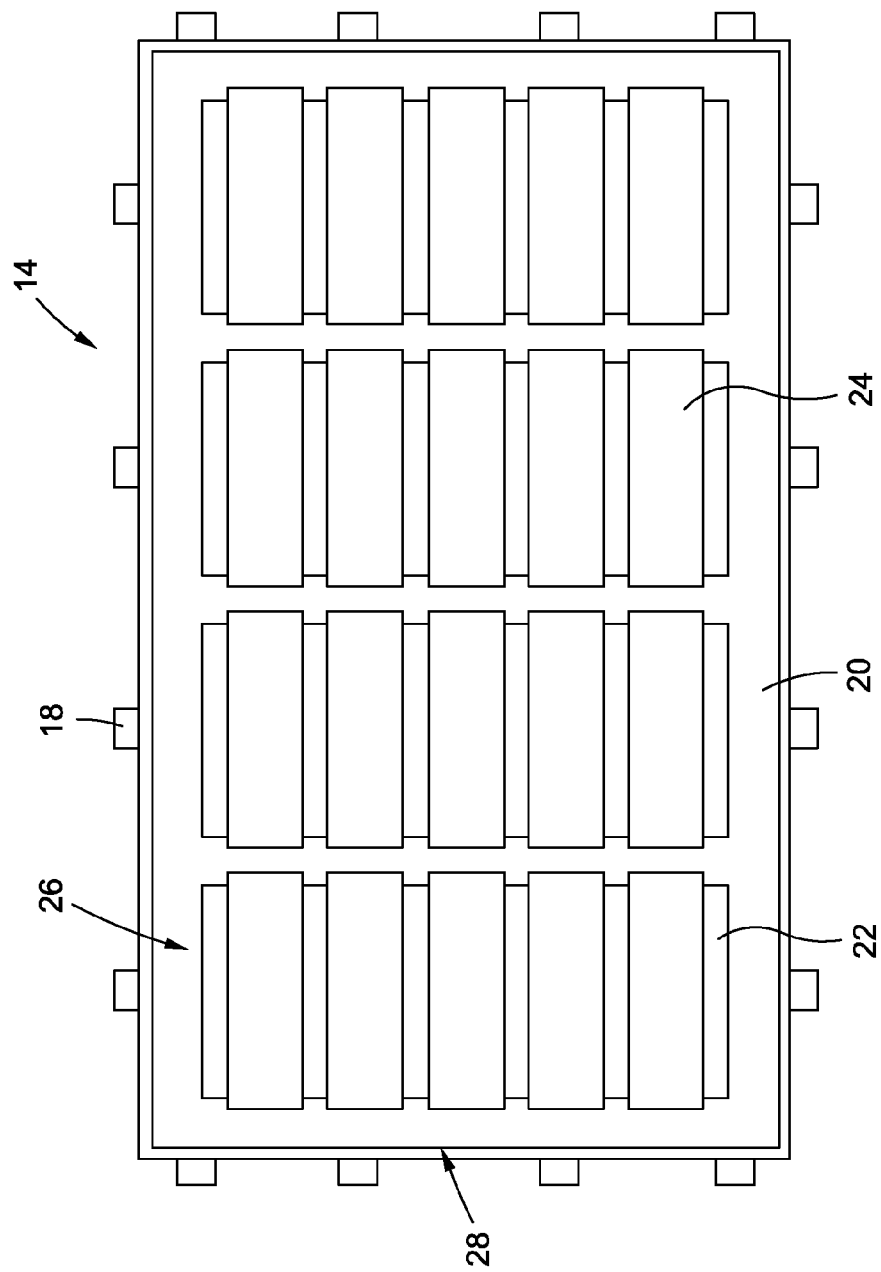
FIG. 2 is a first top view of a supporting element according to the invention.

FIG. 2 is as first top view of a supporting element 14 according to the invention. As illustrated in the figure, the supporting element 14 is constructed of a module supporting element 20 and of a number of plate-shaped closing elements, as an example, one of the closing elements being marked by reference number 22. The closing elements 22 are partially hidden by power storage modules, of which, as an example, one has the reference number 24. The power storage modules 24 are fastened by way of module fastening elements not illustrated in FIG. 2 to the module supporting element 20, the fastened power storage modules being arranged in a number of power storage module rows, of which, as an example, one has the reference number 26. As illustrated in FIG. 2, as a result of the die casting process used for its production, the module supporting element 20 has a minimum wall thickness 28. The module supporting element 20 consistently, therefore also in its bottom area, has this minimum wall thickness 28.

The illustration selected in FIG. 2 should have no limiting effect. On the one hand, a vehicle traction battery as a whole may have a different number of power storage modules. On the other hand, a power storage module row may have a different number of power storage modules.

Figure 3:
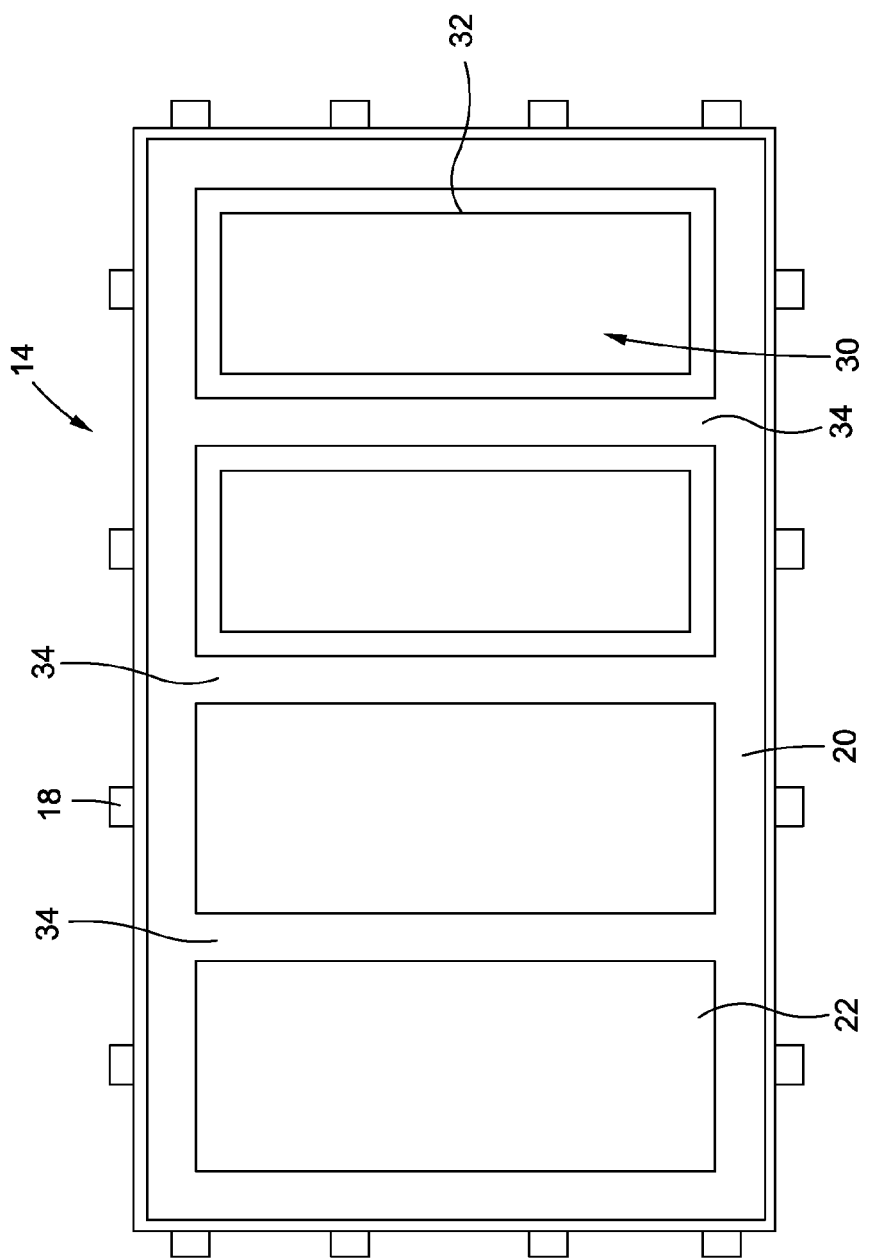
FIG. 3 is a second top view of a supporting element according to the invention.

FIG. 3 is a second top view of a supporting element 14 according to the invention, the power storage modules not being shown in FIG. 3. As shown in the figure, the module supporting element 20 has recesses 30. Each of these recesses 30 is encompassed by a surrounding receiving element 32. Struts 34 are arranged between the individual recesses 30. As an example, in FIG. 3, two of the recesses 30 are in each case closed by means of a plate-shaped closing element 22. For reasons of clarity, no module fastening elements are illustrated in FIG. 3. In addition, the element fastening holes were not shown, by means of which the closing elements are screwed to the module supporting element.

In contrast to the illustration in FIG. 3, the housing fastening elements 18 may be arranged at the longitudinal sides of the module supporting element 20, preferably in each case at the level of the struts 34.

Figure 4:
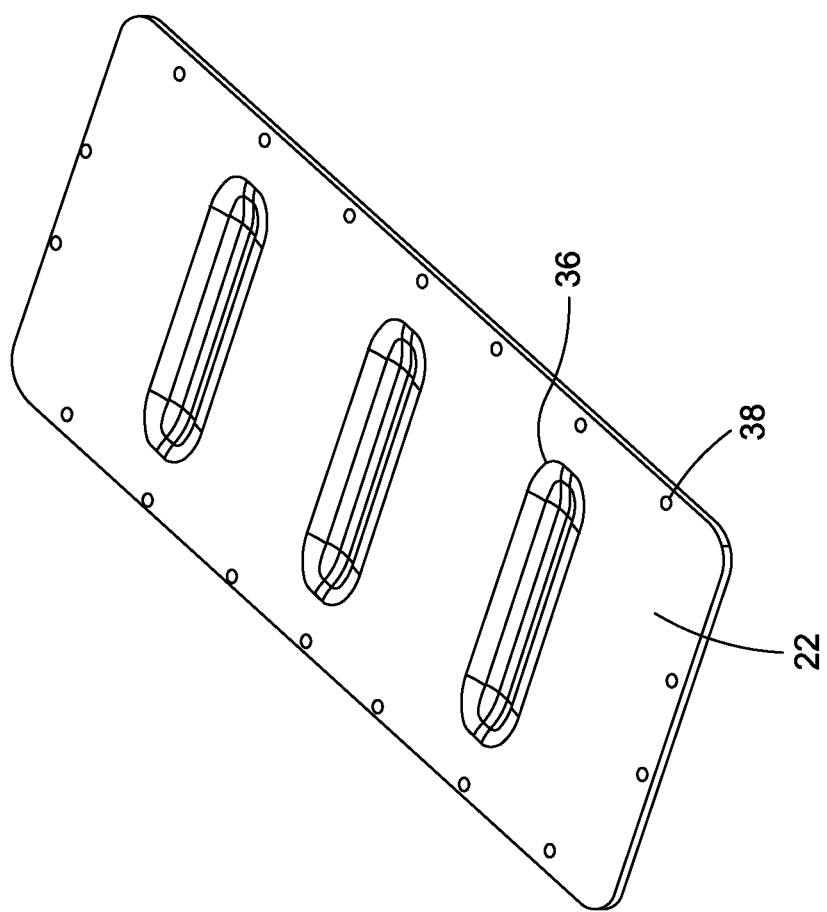
FIG. 4 is a perspective view of a plate-shaped closing element.

FIG. 4 is a perspective view of a plate-shaped closing element 22. The closing element 22 has structural elements, of which, as an example, one has the reference number 36. The structural elements 36 stiffen the closing element 22. The illustration of the structural elements selected in FIG. 4 should have no limiting effect. Naturally, a different number or a different position and shape of the structural elements may be provided. Furthermore, the closing element 22 has a plurality of bores 38 which have the purpose of fastening the closing element 22 to the module supporting element 20.

Figure 5:
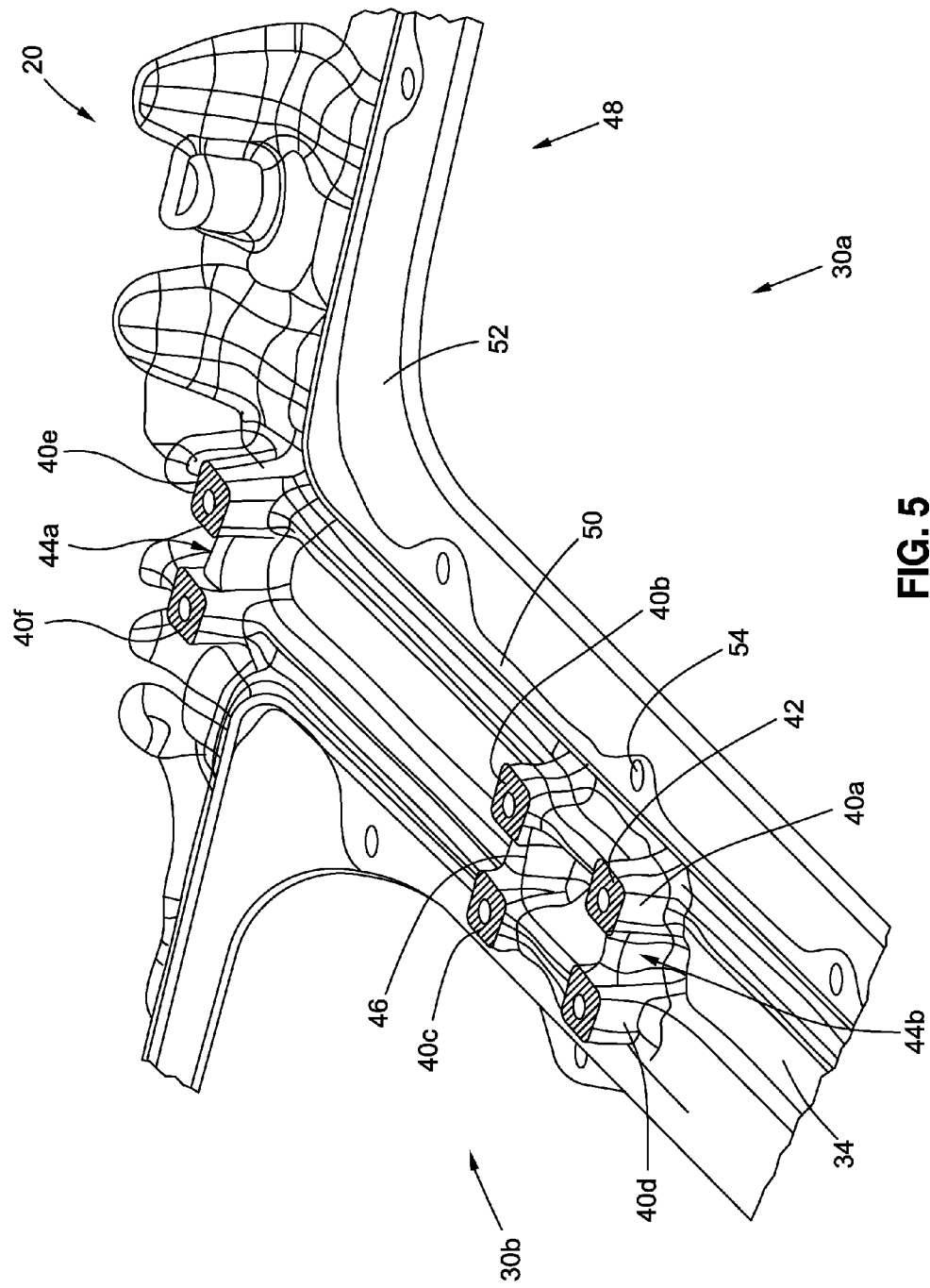
FIG. 5 is a perspective view of a section of a module supporting element.

FIG. 5 is as perspective view of a section of a module supporting element 20. This section shows a first recess 30a and a second recess 30b as well as a strut 34 situated between the two recesses. As illustrated, the strut 34 has a U-shaped profile. The strut 34 further has module fastening elements 40 which, in turn, each have a module fastening hole, which are provided for the fastening of power storage modules 24 to the module supporting element 20. As an example, one of the module fastening holes has the reference number 42. The module fastening elements 40 are combined to module fastening composites 44 which, as a function of the mounting site at the module supporting element 20 have a different number of module fastening elements 40. The module fastening composite 44a arranged in the edge area of the module supporting element 20 has two module fastening elements 40e, 40f. Whereas the module fastening composite 44b arranged in the interior area of the module supporting element 20 has four module fastening elements 40a, 40b, 40c, 40d. Between the individual module fastening elements 40, reinforcing ribs 46 are arranged, one of which, as an example, having the reference number 46. By way of the two module fastening elements 40b, 40e and two additional module fastening elements not shown in FIG. 5, a first power storage module, which is not shown, is fastened to the module supporting element 20. Correspondingly, a second power storage module is fastened to the module supporting element 20 by way of the two module fastening elements 40c, 40f and two further not shown module fastening elements.

As illustrated in FIG. 5, as a result of the further development of the module fastening elements 40, a space is formed between the module supporting element 20 and a power storage module 26 fastened to the latter, which space is used, for example, for accommodating a not illustrated cooling device, by which the power storage module 26 can be cooled.

The following statements refer to the first recess 30a but correspondingly apply to the second recess 30b. The first recess 30a is encompassed by a receiving element 48, which is used for receiving a closing element 22 by which the first recess 30a is closed. The receiving element 48 has a bearing area 50 and a receiving area 52 offset with respect to the bearing area 50. As a result of the fact that the receiving area 52 is offset, a space is formed in this area between the closing element 22 disposed on the bearing area 50 and the module supporting element 20, which space is used for the accommodation of an adhesive by which the closing element 22 is glued to the module supporting element 20. The bearing area 50 has a number of element fastening holes 54, by way of which the closing element 22 can be screwed to the module supporting element 20. The receiving area 52 preferably has a width of several millimeters.

Figure 6:
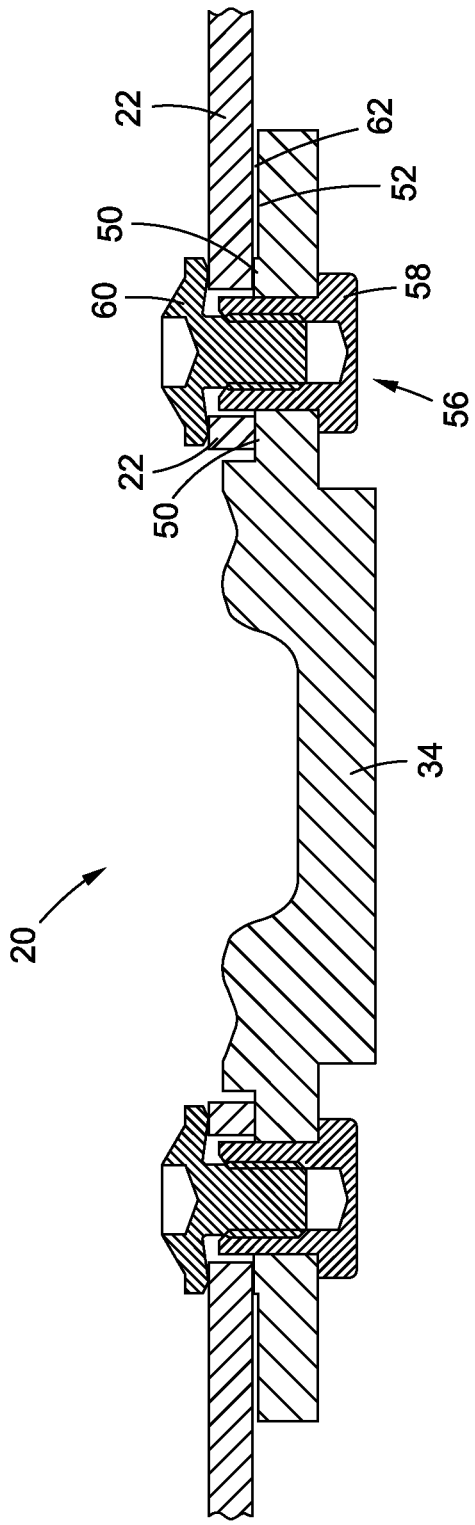
FIG. 6 is a cross-sectional view of a module supporting element in the area of a strut.

FIG. 6 is a cross-sectional view of a module supporting element 20 in the area of a strut 34. FIG. 6 illustrates an arrangement which is symmetrical with respect to the strut, so that only one half of the arrangement will be described in the following.

The strut 34 changes into a bearing area 50 in which a passage hole 56 is arranged. A socket 58 is placed in this passage hole, into which socket a screw 60 is screwed and the closing element 22 in the bearing area 50 is thereby screwed to the module supporting element 20. As illustrated in FIG. 6, the receiving area 52 is offset with respect to the bearing area 50, so that a space 62 is formed between the closing element 22 and the module supporting element 20, which space 62 is used for receiving an adhesive that is not shown, by means of which the closing element 22 is glued to the module supporting element 20.

LIST OF REFERENCE NUMBERS

10 Housing
12 Vehicle traction battery
14 Supporting element
16 Covering element
18 Housing fastening element
20 Module supporting element
22 Closing element
24 Power storage module
26 Row of power storage modules
28 Minimum wall thickness
30 Recess
32 Receiving element
34 Strut
36 Structural element
38 Bore
40 Module fastening element
42 Module fastening hole
44 Module fastening composite
46 Reinforcing rib
48 Receiving element
50 Bearing area
52 Receiving area
54 Element fastening hole
56 Passage hole
58 Socket
60 Screw
62 Space The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supporting element for a housing for a vehicle traction battery constructed of a number of power storage modules, the supporting element comprising:
a module supporting element and at least one metal plate closing element,
wherein the module supporting element has a number of module fastening elements to which the number of power storage modules are fastened such that the number of power storage modules are supported over the closing element, and
wherein the module supporting element further has at least one recess which is closed by the plate-shaped closing element such that the number of power storage modules are not supported by the closing element.

2. The supporting element according to claim 1, wherein the recess is essentially arranged below at least one fastened power storage module.

3. The supporting element according to claim 1, wherein the number of module fastening elements are arranged such that the fastened power storage modules are arranged in a number of power storage module rows, the recess and the plate-shaped closing element each being constructed such that, with respect to their dimensions, they essentially correspond to an area which is covered by a row of power storage modules.

4. The supporting element according to claim 1, wherein the number of module fastening elements are arranged such that the fastened power storage modules are arranged in a plurality of power storage module rows, a recess being arranged below each power storage module row.

5. The supporting element according to claim 3, wherein the number of module fastening elements are arranged such that the fastened power storage modules are arranged in a plurality of power storage module rows, a recess being arranged below each power storage module row.

6. The supporting element according to claim 1, wherein the module supporting element further has a receiving element encompassing the recess, the receiving element having a bearing area and a receiving area offset with respect to the bearing area, the closing element being glued to the module supporting element by way of an adhesive arranged in the receiving area.

7. The supporting element according to claim 3, wherein the module supporting element further has a receiving element encompassing the recess, the receiving element having a bearing area and a receiving area offset with respect to the bearing area, the closing element being glued to the module supporting element by way of an adhesive arranged in the receiving area.

8. The supporting element according to claim 4, wherein the module supporting element further has a receiving element encompassing the recess, the receiving element having a bearing area and a receiving area offset with respect to the bearing area, the closing element being glued to the module supporting element by way of an adhesive arranged in the receiving area.

9. The supporting element according to claim 1, wherein the bearing area has a number of element fastening holes, by way of which the closing element is screwed to the module supporting element.

10. The supporting element according to claim 4, wherein the bearing area has a number of element fastening holes, by way of which the closing element is screwed to the module supporting element.

11. The supporting element according to claim 6, wherein the bearing area has a number of element fastening holes, by way of which the closing element is screwed to the module supporting element.

12. A housing for a vehicle traction battery, wherein the housing has a supporting element according to claim 1 and a covering element.

13. A process of producing a supporting element for a housing for a vehicle traction battery, the vehicle traction battery being constructed of a number of power storage modules, the process comprising the acts of:
   providing a module supporting element produced by a die casting process, which has a number of module fastening elements and at least one recess;
   providing at least one plate-shaped closing element that comprises a metal plate; and
   closing the recess by means of the plate-shaped closing element such that, when the power storage modules are supported over the closing element by the module supporting element, the power storage modules are not supported by the closing element.

14. A process of producing a vehicle traction battery, comprising the acts of:
   providing a supporting element that is constructed of a module supporting element and at least one plate-shaped closing element, wherein the module supporting element is produced by a die casting process and the plate-shaped closing element is a metal plate, the module supporting element having a number of module fastening elements and at least one recess which is closed by the plate-shaped closing element;
   providing a number of power storage modules;
   fastening the power storage modules to the module fastening elements; and
   connecting the supporting element with a covering element such that, when the power storage modules are supported over the closing element by the module supporting element, the power storage modules are not supported by the closing element.

* * * * *